Dec. 7, 1954

W. B. SMITS 2,696,512

IGNITION SYSTEM FOR A JET ENGINE AND THE LIKE

Filed Jan. 4, 1952

INVENTOR
WYTZE BEYE SMITS,

BY Robert B Pearson

ATTORNEY

# United States Patent Office 2,696,512
Patented Dec. 7, 1954

2,696,512

IGNITION SYSTEM FOR A JET ENGINE AND THE LIKE

Wytze Beye Smits, Voorburg, Netherlands, assignor to Smitsvonk N. V. Research Laboratory, Comp., Rijswijk (S. H.), Netherlands Application January 4, 1952, Serial No. 265,016

4 Claims. (Cl. 123—148)

Jet engines or gas turbines for aircraft are generally equipped with a relatively large number—for example nine—of combustion chambers arranged in a circle, which are connected in parallel with an exhaust pipe or/and act on a turbine. For the ignition of the mixture in the combustion chambers one or either of at most two of these chambers is provided with an electric igniter torch, consisting of a high-voltage spark plug and a liquid atomizer which atomizes ignition fuel in the immediate vicinity of the spark plug, while the combustion chambers are inter-connected by channels. The ignition fuel generally used is the normal fuel, which is driven through the atomizer of the igniter torch by a separate pump under increased pressure. This ignition fuel is ignited by the electric spark from the spark plug, and then ignites the fuel in the combustion chamber in which the torch is provided. Through the connecting channels the ignition spreads to the combustion chambers without igniter torches.

The drawbacks of this known ignition system for jet engines and gas turbines are of many kinds. In view of the high voltage and the rarefied air in which the aircraft may have to fly, the electric conductors of this system must be electrically insulated very heavily, must not be liable to cause any corona phenomena, and must be supported by long insulators. In addition, separate coils are required. Owing to this, the ignition system takes up much space and has great weight, so that it is to be considered very ineffective, if not practically impossible, to equip each of the combustion chambers with an igniter torch of its own and accessories. It has further been found that when the velocity of the air in the combustion chambers—which velocity is also determined by the speed of the aircraft—exceeds a given value, the spark plug is no longer capable of igniting the ignition fuel atomized by the torch, while at a slightly greater velocity of the air the burning torch is blown out. Further it has been established that with the high velocities of the air that may occur the flame will have difficulty in spreading through the connecting channels from one combustion chamber to the next or will fail to do so altogether. If the ignition is to be guaranteed, in the first place care has to be taken that the air current in the combustion chambers is slowed down. When an aircraft with a jet engine stands on the ground, this requirement can easily be complied with. However, if the aircraft is in the air and is flying at great speed, it appears that the engine, when its burners have been extinguished by some cause or other, cannot be re-ignited until the speed of the aircraft has been considerably slowed down and the aircraft proceeds to fly at lower altitudes. Even then the re-ignition appears to be doubtful, while the risk of accidents owing to the failure of this ignition is still great. But even when the re-ignition of the fuel in the combustion chambers with ignition torch is effected properly, it is not certain that the other burners will also be re-ignited. If this does not happen, these burners will continually inject into the chambers fuel which is not burned. As soon as the velocity of the air is decreased and the flame spreads from one combustion chamber to the next, a violent explosition is liable to occur in the chambers that have not yet been ignited and the other spaces for the conducting of the combustion gases, and this explosion may cause the aircraft to be wrecked.

The invention provides a method of electric ignition of a jet engine or a gas turbine which makes it possible to equip all the combustion chambers, or at large number of them, with igniter plugs, which plugs guarantee the proper ignition of the fuel under any conditions that may present themselves during flight, so that the difficulties outlined above can be obviated altogether. This method consists in that the spark plugs are surface discharge spark plugs and can be successively connected for a short time to a condenser system by a distributor.

Surface discharge spark plugs fed by condensers may operate at comparatively very low voltages, so that the problems of the insulation, which are already known in the known ignition systems for jet engines or gas turbines for aircraft, present no difficulties. The surface discharge spark generated exclusively by a condenser is insensitive to the air current prevailing in the combustion chambers and to the deposition of fuel and combustion products on the spark plugs. The output of such a spark is so great that re-ignition of the mixture in the combustion chambers is possible without any difficulty. The use of a distributor makes it possible to use one and the same condenser system with charging device for the successive operation of a large number of spark plugs. All the combustion chambers of the jet engine or gas turbine can therefore be equipped with a spark plug of their own, without the weight of the ignition system becoming unduly large. The risk of explosions in chambers in which the mixture is not directly ignited by the ignition system is thus reduced to nil.

The low-voltage surface discharge spark plugs operating on condensers also have the advantage that when additional ignition liquid is fed to the spark plug, this liquid need not be atomized under high pressure, as in the known high-voltage torch ignition systems. The liquid fuel may be fed to the spark plugs under normal pressure, because this ignition liquid can be atomized by the energy of the spark itself.

According to the invention use is preferably made of a system in which the distributor is driven by a device controlled by the current impulse for the generation of an ignition spark. Thus no separately excited and accurately controlled driving gear for the distributor is required.

When a jet engine or gas turbine is provided with an electric ignition device with a condenser system, a source of current for charging the condenser system, at least two surface discharge spark plugs each provided in their own combustion chamber, and a distributor connected between the condenser system and the spark plugs, by means of which distributor the spark plugs can be successively connected to the said condenser system, if the distributor is to be stepped up in due time, each spark plug may be connected to a fixed contact point of the distributor via the coil of a relay, the rotatable contact arm of the distributor may be connected with a condenser of the condenser system and mechanically coupled with an electro-magnetic stepping-up mechanism, and the relay, upon being excited through the current impulse for the ignition spark at the spark plug, may operate a contact point which closes the circuit of the stepping-up mechanism. For the same purpose each spark plug may be connected to a fixed contact point of the distributor, the rotatable contact arm of the distributor may be connected with a condenser of the condenser system via the coil of a relay and mechanically coupled with an electro-magnetic stepping-up mechanism, and the relay, upon being excited through the current impulse for the ignition spark at the spark plug, may operate a contact point which closes the circuit of the stepping-up mechanism.

In order that the voltage of the condenser, at which the latter discharges via a spark plug, may be predetermined, a spark gap may be incorporated in the circuit between the spark plug and the condenser.

It is advantageous to design the spark plugs in such a way that they can produce at least two sparks in rapid succession. The first spark will then chiefly serve to atomize the ignition fuel collected or introduced in the vicinity of the sparking surface of the spark plug, while the second spark has to ignite the atomized fuel. For the generation of this second spark the condenser system may contain a second condenser, and the relay may operate a second contact point, which is connected between the said second condenser and the connecting terminal of the relay coil turned towards the spark plugs.

It is also possible to connect the second condenser of the condenser system to the spark plugs via a second distributor coupled mechanically with the distributor already referred to, in such a way that each time the second condenser is connected shortly after the first condenser to one and the same spark plug.

The invention is explained further with reference to the drawing, which illustrates by way of example a number of diagrams of ignitions systems according to the invention.

In this drawing:

Figure 1 shows an ignition system with spark plugs, in which each spark plug is connected in series with a relay of its own, Figure 2 shows an ignition system in which a single relay is present for all the spark plugs, and, Figure 3 shows an ignition system with a single relay for all the spark plugs and two mechanically coupled distributors.

In the drawing, the numeral 1 designates a battery. This battery may feed the primary winding 6 of a transformer via a switch 2—which may be a hand switch—and the contact points 3, 4 of a magnetic interrupter with coil 5. The interrupter 3, 4, 5 converts the direct current furnished by the battery 1 into a pulsating direct current, the alternating current component of which is stepped up by the transformer 6, 7 in such a way that the secondary winding 7 of the transformer furnishes an alternating current of a comparatively high voltage, for example 2,000 volts. The secondary winding is connected via rectifiers 8, 9, and 10 to condensers 11 and 12, and serves to charge these condensers. The condenser 11 is connected with the contact arm 13 of a distributor, such fixed contact point 14 of which is connected via the coil 15 of a relay to one electrode of a surface discharge spark plug 16, the other electrode of which is connected to a neutral wire 17, to which are also connected the condensers 11, 12 the transformer windings 6, 7, and one pole of the battery 1. The relay coil 15 acts on two contact points 18, 19, the contact point 18 of which establishes a direct connection between the condenser 12 and the spark plug 16, while the contact point 19 can close the circuit of an electromagnet 20, of which the armature 21 of which is provided with a pawl 22, which engages with a ratchet wheel 23 coupled mechanically with the rotating contact arm 13 of the distributor.

In the position of the rest the contact arm 13 of the distributor is at some distance from a fixed contact point 14. The members 13, 14 form a spark gap in the discharge circuit of the condenser 11. When the switch 2 is closed, the condensers 11 and 12 are charged, until the voltage of the condenser 11 has become so high that the spark gap 13, 14 breaks down. The condenser 11 then discharges via the distributor, the coil 15 of the corresponding relay, and the corresponding surface discharge spark plug. At this spark plug there is generated a first spark, which atomizes the fuel in the vicinity. The relay 15 attracts its armature and closes its contact points 18 and 19. By the contact point 18 the spark plug 16 is then directly connected to the second condenser 12 of the condenser system, so that this condenser will also discharge via the spark plug, and a second spark is generated, which ignites the fuel that has meanwhile been atomized. The contact point 19 closes the circuit of the magnet coil 20, so that the latter also attracts its armature 21 with the pawl 22, thus advancing the ratchet wheel 23, with the contact arm 13 of the distributor coupled to it, one step further. During the stepping-up of the distributor arm the condensers 11 and 12 are charged again, so that, when the contact arm 13 again faces a fixed contact point 14, the following spark plugs come into operation.

In Fig. 2 the spark plugs 16 are directly connected to the fixed contact points of the distributor. In this diagram the relay coil 24 is incorporated between the condenser 11 and the contact arm 13 of the distributor. A spark gap 25, which may be adjustable, is also connected in series with it. The relay coil 24 corresponds entirely to the relay coil 15 in Fig. 1. It operates two contact points 26, 27.

As soon as in this system the voltage of the condenser 11 has risen sufficiently, the spark gap 25 breaks down, and a spark for atomizing the fuel is generated at the spark plug 16. The spark current passes through the relay coil 24. As a result of this, the contact points 26, 27, which correspond to the contact points 18, 19 in Fig. 1, are closed again, the condenser 12 is directly connected to the contact arm 13, and via the latter across the fixed contact point 14 of the distributor to the spark plug 16, and the circuit of the stepping-up mechanism of the distributor, which mechanism may be designed as shown in Fig. 1, is closed by the contact point 27.

In Fig. 3, as in Fig. 2, a relay coil 24 is connected between the condenser 11 and the contact arm 13 of the distributor. The relay coil 24 only operates the contact point 27 for closing the circuit of the stepping-up mechanism, which is omitted in the drawing, as it is in Fig. 2. The condenser 12 is connected to the spark plug 16 via a second distributor with a contact arm 28 and fixed contact points 29. The contact arms 13 and 28 are coupled and are moved simultaneously by the stepping-up mechanism. They are, however, slightly in phase-shifting, so that first the condenser 11 is connected to the spark plug via the relay coil 24 and the distributor 13, 14, while during the stepping-up, through the excitation of the relay 24, 27, the contact arm 28 of the second distributor is moved past the fixed contact point 29 of the respective spark plug, and the condenser 12 can discharge via this spark plug.

Within the scope of the invention several features shown in Figs. 1, 2, and 3 may be combined. Thus it is possible to use a spark gap 25 in all the circuit connections. Further it is not necessary to employ relays. Instead of these, gas discharge tubes with control electrodes might be used.

I claim:

1. Installation for the ignition of the fuel introduced into a number of cooperating combustion chambers of a jet engine and the like, comprising, low tension surface discharge spark plugs located in at least two of said chambers, a condenser and power supply system for energizing said spark plugs, a distributor and circuit means for selectively connecting said condenser system to said spark plugs, a stepping up mechanism for driving said distributor, means operatively connecting said stepping up mechanism with said distributor, and means for utilizing a current impulse in the generation of the ignition spark to cause the operation of said stepping up mechanism.

2. An installation according to claim 1 in which said last-named means comprises a relay coil connected in series with each said spark plug, and switch means operable by said relay coil to connect said stepping up mechanism to said power supply at each said current impulse.

3. An installation according to claim 2, further comprising, a second switch closable by energization of said relay coil, and a second condenser for initiating a spark discharge connected to said spark plug by said second switch, whereby, for each spark plug, two condensers can cause successive spark discharges.

4. An installation according to claim 1, further comprising, a second condenser and a second distributor mechanically coupled with said first distributor, whereby two condensers can be discharged in succession for each spark plug.

References Cited in the file of this patent

UNITED STATES PATENTS

| Number | Name | Date |
|---|---|---|
| 1,385,980 | Allcutt | Aug. 2, 1921 |
| 2,523,408 | Williford | Sept. 26, 1950 |
| 2,568,125 | Jacobs | Sept. 18, 1951 |
| 2,589,164 | Tognola | Mar. 11, 1952 |